United States Patent [19]

Cauthron

[11] Patent Number: 4,459,942
[45] Date of Patent: Jul. 17, 1984

[54] ANIMAL SPRAYING APPARATUS

[76] Inventor: Grover L. Cauthron, Rte. 1, Box 29, Fairview, Mo. 64842

[21] Appl. No.: 473,053

[22] Filed: Mar. 7, 1983

[51] Int. Cl.³ .......................................... A01K 29/00
[52] U.S. Cl. .................................................. 119/159
[58] Field of Search ....................... 119/159, 156, 160

[56] References Cited

U.S. PATENT DOCUMENTS

| | | | |
|---|---|---|---|
| 974,042 | 10/1910 | Dresback et al. | 119/159 |
| 1,546,898 | 7/1925 | Hinken | 119/159 |
| 2,316,932 | 4/1943 | Bruce | 119/159 |
| 3,032,011 | 5/1962 | Stramel | 119/159 |
| 3,602,199 | 8/1971 | Diggs | 119/159 |
| 3,699,928 | 10/1972 | Cowan | 119/159 |
| 4,126,104 | 11/1978 | Overby | 119/159 |
| 4,165,715 | 8/1979 | Knupp | 119/159 |

Primary Examiner—Robert Peshock
Assistant Examiner—Kris R. Schulze
Attorney, Agent, or Firm—D. Paul Weaver

[57] ABSTRACT

A unitary portable and self-contained spraying apparatus for farm animals may rest on top of a feed or watering trough and is operated by the animal when the animal moves its head to a food or water consuming position. In so doing, the animal elevates a pivoted panel on a rocker shaft having crank extensions which produce movements of connecting elements leading to the triggers of three separate spraying units. Two of the spraying units dispense pesticide or medicine onto the face of the animal while the third spray unit dispenses onto the animal's back to rid it of insects, parasites and grub. The apparatus is simple in construction, rugged and durable and efficient.

10 Claims, 7 Drawing Figures

ANIMAL SPRAYING APPARATUS

BACKGROUND OF THE INVENTION

A variety of devices for applying pesticides, insecticides and medicines to farm animals are known in the prior art. Such devices apply fluids or powders to the animals by utilizing smears, rollers, rubs, shakers and sprays. A common criticism of such prior art devices is that they over-apply the materials and apply them in areas which do not require protection, thereby resulting in waste of expensive materials of the above-mentioned types.

Accordingly, one important object of this invention is to provide an applicator apparatus whereby sprays of pesticides, medicines and the like may be applied to farm animals with economy in exactly the required areas without wasting the material.

Another objective of the invention is to provide an applicator apparatus of the above type which is animal-operated when the animal seeks food or water or seeks access to a salt block.

Another object of the invention is to provide an improved animal spraying apparatus in the form of a self-contained unit which may rest bodily on a feed or watering trough, is readily portable, and contains multiple simultaneously operated sprays to deliver protective materials to the most critical areas of the animal, namely, the face, head and back.

Still another object is to provide an apparatus of the above type which is simple, rugged and economical to manufacture, and which requires little maintenance.

Other features and advantages of the invention will become apparent during the course of the following description.

DETAILED DESCRIPTION

Figure 1:
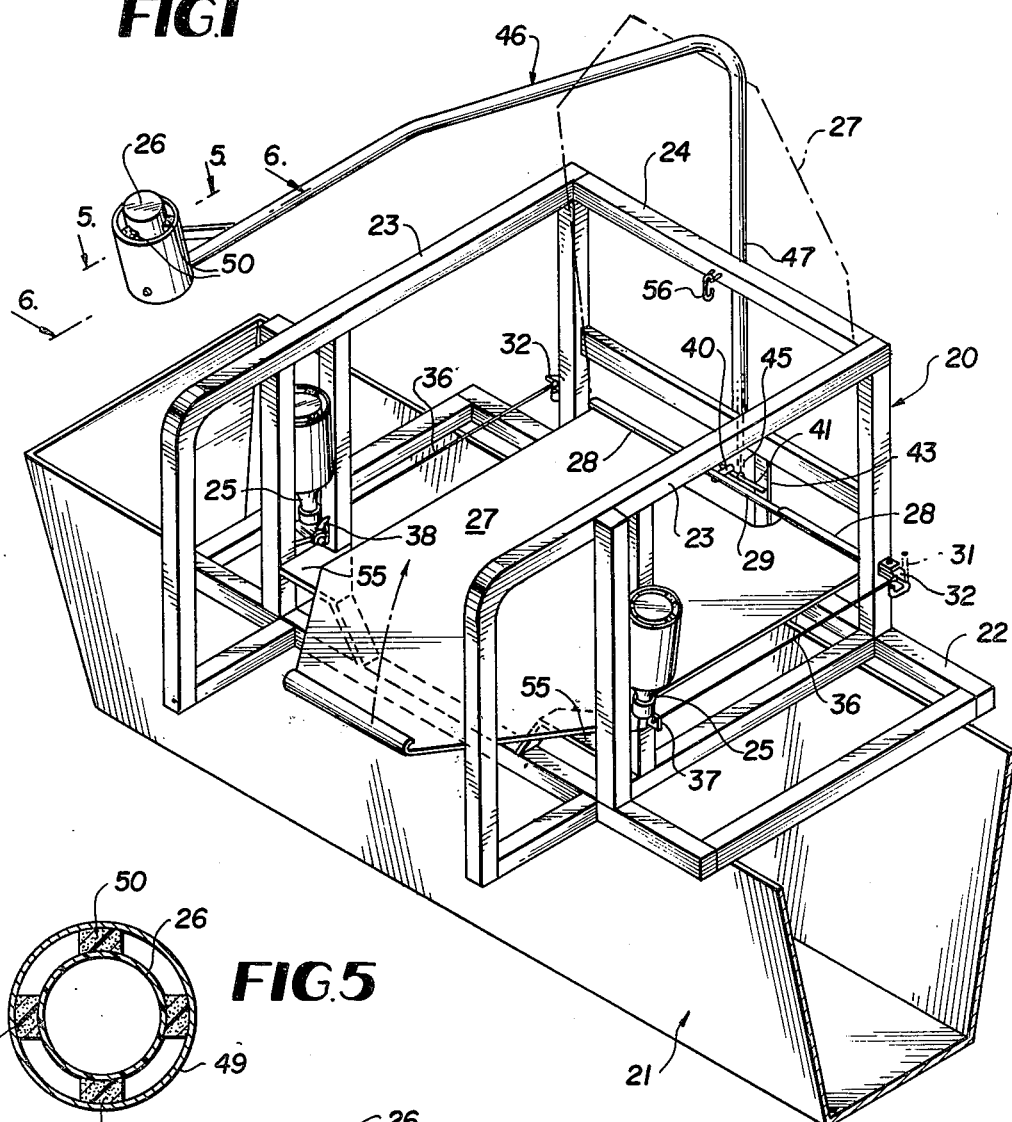
FIG. 1 is a perspective view of an animal spraying apparatus according to the present invention.
Figure 5:
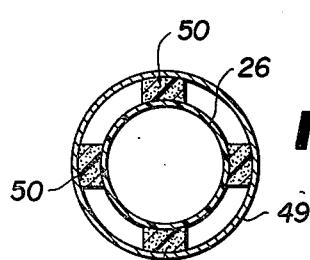
FIG. 5 is an enlarged cross section taken through an overhead spray unit on line 5—5 of FIG. 1.
Figure 2:
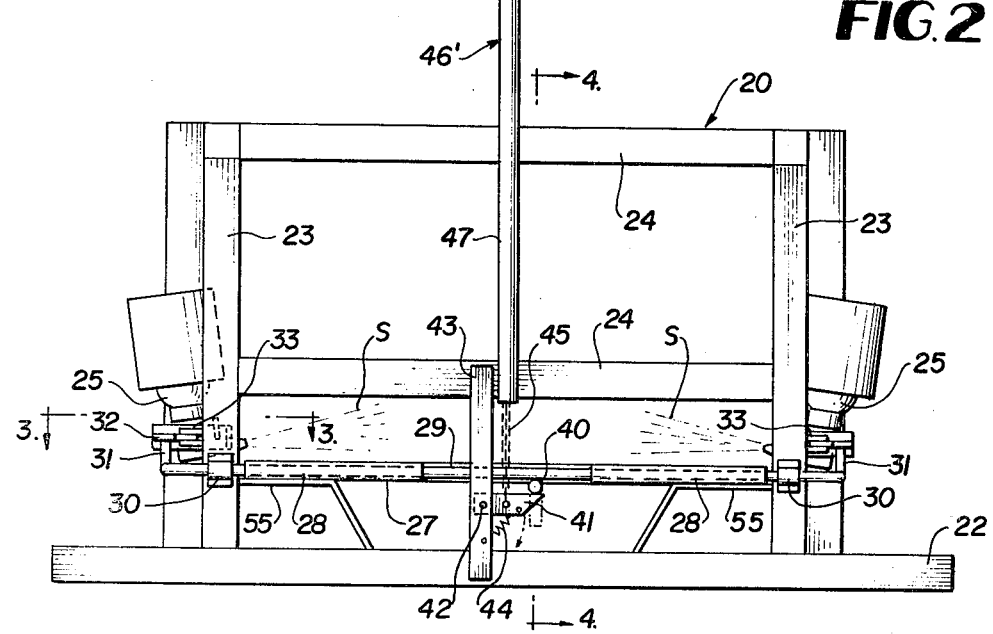
FIG. 2 is a rear elevation of the apparatus.

Referring to the drawings in detail wherein like numerals designate like parts, a self-contained unitary and portable spray apparatus 20 according to the invention shown in its entirety in FIGS. 1 and 2 may rest on top of any farm animal feed or watering trough 21, as depicted in FIG. 1.

The apparatus 20 comprises a unitized rigid frame including a bottom horizontal rectangular frame section 22 which directly engages the top of the trough 21, two spaced vertical side sections 23, and a rear vertical frame section 24 which rigidly interconnects the side sections 23, the front of the frame being open, as shown in FIG. 1. The frame 20 may be of welded construction and its details can be varied somewhat to accommodate different needs. For example, with only slight changes in the framework and slight relocation of the spraying units, the apparatus can apply the required materials to the face and eye areas of horned animals, the illustration in the present drawings being for non-horned domestic animals.

The apparatus includes three simultaneously operated spray units for insecticide, etc. Two lower spray units 25 are held near and above the base frame section 22 near the rear side of the trough 21, with respect to the animal's head, to spray opposite sides of the face including the eye region. One overhead spray unit 26 is positioned above, rearwardly of, and midway between the two spray units 25 to spray the neck and back of the feeding animal.

A vertically swingable flat animal-actuated panel 27 extends between frame sides 23 from the rear of the frame 20 to a point close to its open entrance and somewhat beyond the entrance side wall of the trough 21, FIG. 1. The far end of the panel 27 has knuckles 28 secured to a transverse horizontal rocker shaft 29 journaled in bearings 30 near its opposite ends, these bearings being held on the rear frame section 24 near and above base frame section 22, FIG. 2. The rocker shaft turned by swinging movement of the panel 27 is the primary control element for the simultaneous dispensing of sprays from the three spray units 25 and 26.

More particularly, the rocker shaft 29 at its opposite ends carries crank arms 31 outwardly of side frame sections 23 which engage trap levers 32 pivotally secured as at 33 to side frame sections 23. The pivoted trip levers 32 are stabilized and biased in one direction by springs 34 secured to anchors 35 on the rear of the framework.

Figure 3:
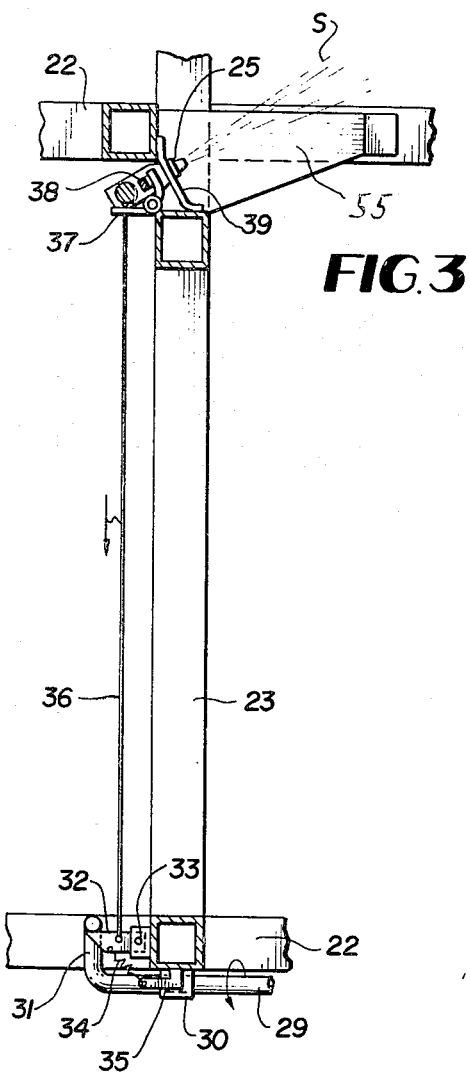
FIG. 3 is an enlarged fragmentary horizontal section taken on line 3—3 of FIG. 2.

The trip levers 32 are attached to fore and aft extending horizontal cables 36 whose far ends are connected with pivoted actuator levers 37 adjacent to the side spray units 25. The pivoted levers 37, in turn, engage dispensing control elements 38 of the conventional spray units 25 to effect the release of insecticide spray therefrom. The two fluid sprays from the units 25 are simultaneously directed inwardly approximately horizontally and at an angle toward the open end of the frame 20 to treat the opposite sides of the feeding animal's face as graphically shown at S in FIGS. 2 and 3. As best shown in FIG. 3, the dispensing nozzles of the spray units 25 are positioned and held by fixed frame attached brackets 39.

At its longitudinal center, the rocker shaft 29 carries a pin actuator 40 rigidly attached thereto and this pin element bears upon a trip lever 41, pivotally mounted at 42 on an adjacent vertical frame bar 43. The trip lever 41 is biased by a spring 44, FIG. 2.

A chain 45 has one end connected to the trip lever 41 and extends through the rigid guide tube 46 whose vertical portion 47 is fixed to frame section 24 at the transverse center of the frame. The upper approximately horizontal portion of the guide tube 46 extends to approximately the open entrance end of the frame 20 and above the frame to deliver a spray S' downwardly, FIG. 2, onto the neck and back of the animal.

Figure 6:
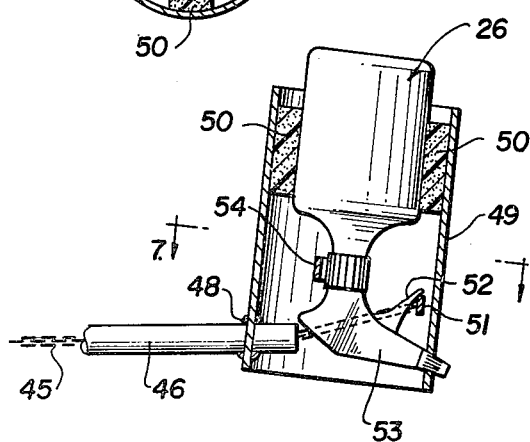
FIG. 6 is an enlarged vertical section through the same spray unit taken on line 6—6 of FIG. 1.
Figure 7:
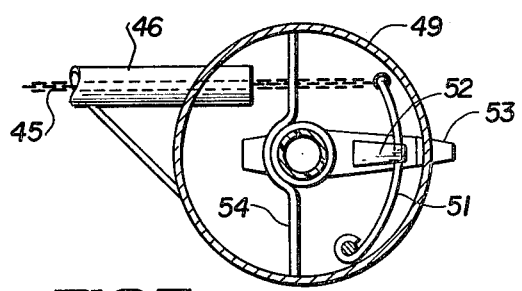
FIG. 7 is an enlarged fragmentary cross section taken on line 7—7 of FIG. 6.

The guide tube 46 has its free end fixed at 48, FIG. 6, to a holding sleeve 49 for the overhead spray unit 26 which may be in the form of a bottle or can. The sleeve 49 is equipped with internal pads 50 which snugly hold the unit 26 against movement. The chain 45 emerges from the guide tube 46 within the sleeve 49 near its lower end and is connected with a pivoted operating lever 51 within the sleeve which pivoted lever engages and operates a conventional spray release element 52 on the nozzle 53 of the unit 26. The arrangement is similar to that described for the two lower spray units 25. A cross brace 54 in the support sleeve 49 engages and stabilizes the neck portion of the spray unit 26, as shown in the drawings.

The apparatus is illustrated in the drawings with the animal-operated panel 27 in a down level non-spraying position which is the normal "at rest" position. In this position, the free tapered end of the panel 27 rests on ledges 55 fixed to the frame 20. The associated mechanism elements are in their positions shown in the other drawing figures. The slope of the ledges 55 directs underspray or dripping from the lower spray units 25 to fall harmlessly to the ground, not contaminating the feed, salt of water.

Figure 4:
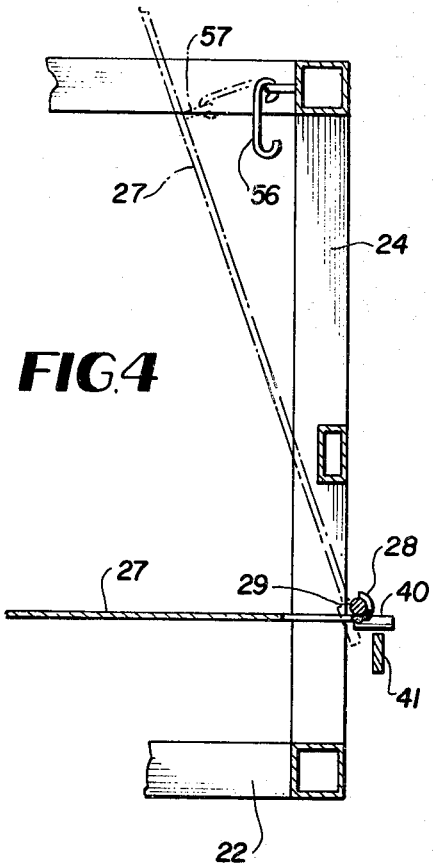
FIG. 4 is an enlarged fragmentary vertical section taken on line 4—4 of FIG. 2.

When an animal seeks access to the trough 21 to feed or drink or lick a salt block therein, it is forced to push its head beneath the panel 27 and between the ledges 55, and in so doing the panel 27 is lifted upwardly by the animal toward the inclined position shown in phantom lines in FIGS. 1 and 4. This panel movement rotates the rocker shaft 29 in its bearings 30 in the direction of the arrow, FIG. 3. The crank extensions 31 act on trip levers 32 and cables 36 to simultaneously turn on the two lower spray units 25 while the panel 27 is held elevated to apply spray to the two sides of the feeding animal's face and head.

Simultaneously, when the rocker shaft 29 rotates, the pin 40 depresses trip lever 41 and pulls on chain 45 which causes lever 51 to operate the spray release element 52 of the upper spray unit 26, whereby a spray of insecticide or medicine is directed onto the neck and back of the animal.

When the animal withdraws its head from the trough 21, the panel 27 is lowered by gravity to the horizontal rest position and the three strategically located sprays are turned off. Consequently, there is no wasting of expensive spray materials. When not required, the entire spray apparatus can simply be lifted as a unit from the trough 21 and set aside or placed in a new position of use.

Preferably, a latching hook 56 is provided at the top and center of frame section 24 to engage an eyelet 57 on the pivoted panel 27 to hold it in a raised position. This feature is to enable the training of timid animals to use the trough 21 with the apparatus in place, and after the animal becomes accustomed to its presence, the hook 56 is released and the animal will operate the spray apparatus in the described manner.

Other forms of operating linkages or driving connecting means between the movable panel 27 and the three spray units 25 and 26 may be employed, and in this connection the invention is not limited to the disclosed mechanism details.

It is to be understood that the form of the invention herewith shown and described is to be taken as a preferred example of the same, and that various changes in the shape, size and arrangement of parts may be resorted to, without departing from the spirit of the invention or scope of the subjoined claims,

I claim:

1. An animal spraying apparatus for mounting bodily and removably on top of a feed or drinking trough for animals, comprising a supporting body portion resting on top of the trough securely a pair of opposite side lower spray units and one elevated center spray unit on said supporting body portion and positioned thereon to spray the face area and back of a feeding animal, a movable animal-operated member connected to the supporting body portion and extending across the trough and engaged and moved upwardly by a feeding animal so as to gain access to the trough and to initiate operation of said spray units and terminating such operation when moved in a downward direction responsive to the cessation of feeding by the animal, a primary spray unit control element connected with the animal-operated member and being movable therewith, and driving connecting means between the spray units and the primary control element whereby the spray units are turned on and turned off in unison by the movements in opposite directions of the animal-operated member.

2. An animal spraying apparatus as defined in claim 1, and the supporting body portion comprising a framework having a horizontal base section to rest on a trough, a pair of spaced parallel sides, a rear side and an open entrance remote from the rear side, and the animal-operated member comprising a liftable member disposed between said parallel sides of the framework near and above the bottom of the framework.

3. An animal spraying apparatus as defined in claim 2, and the animal-operated member comprising a panel member having a normal substantially horizontal resting non-spraying position on the framework, said primary spray unit control element comprising a transverse rocker shaft on the rear side of the framework and being attached to said panel and rotating in one direction when the far end of the panel is elevated by the head of a feeding animal, and said driving connecting means being connected to said rocker shaft.

4. An animal spraying apparatus as defined in claim 3, and said driving connecting means including crank elements on the rocker shaft, two for said opposite side lower spray units and one for said elevated center spray unit.

5. An animal spraying apparatus as defined in claim 4, and said driving connecting means further comprising trip levers on said framework in the paths of movement of the crank elements, one for each of said spray units.

6. An animal spraying apparatus as defined in claim 5, and the driving connecting means further comprising flexible remote control elements connected with the trip levers and leading to and operatively connected with spray release elements of said spray units.

7. An animal spraying apparatus as defined in claim 1, and a support arm for said one elevated center spray unit fixed on the supporting body portion and having a passage therein for a flexible element forming a part of said driving connecting means.

8. An animal spraying apparatus as defined in claim 1, and said spray units each comprising a replaceable spray container and a supporting sleeve for such container fixed on the supporting body portion.

9. An animal spraying apparatus as defined in claim 8, and each sleeve having internal pads for positioning and snugly holding each replaceable spray container.

10. A portable unitary self-contained animal spraying apparatus adapted to be placed removably on an animal feed trough or the like, comprising a framework having a lower substantially horizontal base section, three interconnected upstanding sides rising above the base section and an open end, a vertically swingable animal-operated panel within the framework near and above said base section, a transverse rocker shaft on the framework and being fixed to the animal-operated vertically swingable panel and being turned on its axis in opposite directions by upward and downward vertical swinging of the panel induced by an animal, a pair of lower opposite side animal spray units on the framework above said base section to direct sprays onto the opposite sides of the face and head of a feeding animal, a single central overhead animal spray unit on the framework above and near its open end to direct a spray onto the neck and back of a feeding animal, each spray unit having a movable spray release element, and driving connecting means extending between said rocker shaft and said spray release elements, whereby all of the animal spray units may be activated and turned off in unison responsive to swinging movements of said animal-operated panel.

* * * * *